United States Patent [19]

Ruehl

[11] Patent Number: 4,954,672

[45] Date of Patent: Sep. 4, 1990

[54] GROUND START KEY SWITCH

[75] Inventor: William E. Ruehl, Wheeling, Ill.

[73] Assignee: Illinois Tool Works, Inc., Chicago, Ill.

[21] Appl. No.: 330,774

[22] Filed: Mar. 30, 1989

[51] Int. Cl.$^5$ .............................................. H01R 33/96
[52] U.S. Cl. ........................... 200/51.09; 200/61.58 R; 200/61.62; 379/234; 379/442; 379/332; 439/509; 439/510
[58] Field of Search ................... 200/51.09, 51.11, 243, 200/335, 343, 530, 61.58, 61.62, 61.82, 61.81; 379/442, 21, 27, 29, 234, 332; 439/509, 513, 510, 507, 676, 93

[56] References Cited

U.S. PATENT DOCUMENTS

| | | | |
|---|---|---|---|
| 3,506,789 | 4/1970 | Brockschmidt et al. | 379/234 |
| 4,295,702 | 10/1981 | Snyder | 379/442 |
| 4,594,490 | 6/1986 | McCullough | 200/51.09 |
| 4,796,290 | 1/1989 | Perry | 379/234 |

Primary Examiner—Henry J. Recla
Assistant Examiner—Glenn T. Barrett
Attorney, Agent, or Firm—Schwartz & Weinrieb

[57] ABSTRACT

A ground start key switch for use with a modular duplex adapter to permit momentarily shorting a pair of jack terminals includes a switch actuator mechanism adapted to be mounted onto the modular duplex adapter having a pair of jack terminals and a conductor member attached to the switch actuator mechanism. The switch actuator mechanism includes a resilient lever arm which is depressible for causing engagement of the conductor member with the pair of jack terminals so as to electrically short the pair of jack terminals together.

When the resilient lever arm is released, the resiliency thereof returns the conductor member thereof to its normal position at which the conductor member is disengaged from the pair of jack terminals such that the latter are not longer shorted together.

22 Claims, 2 Drawing Sheets

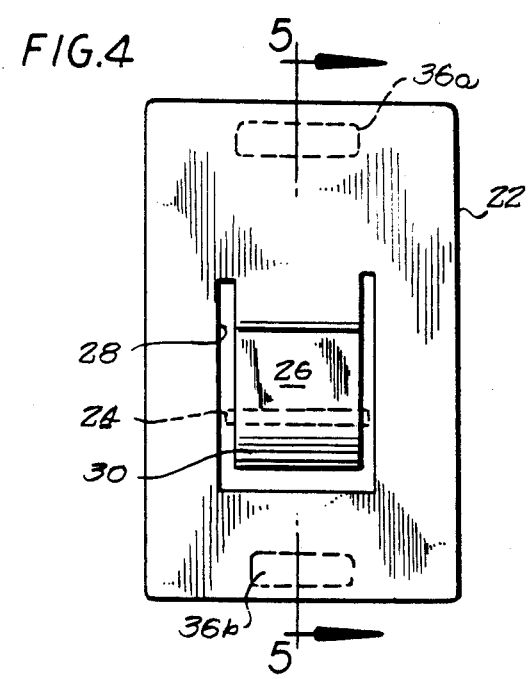
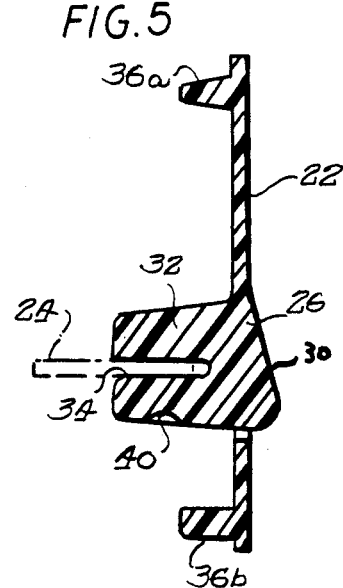
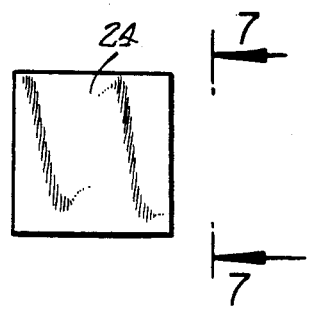
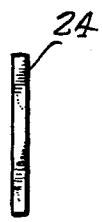
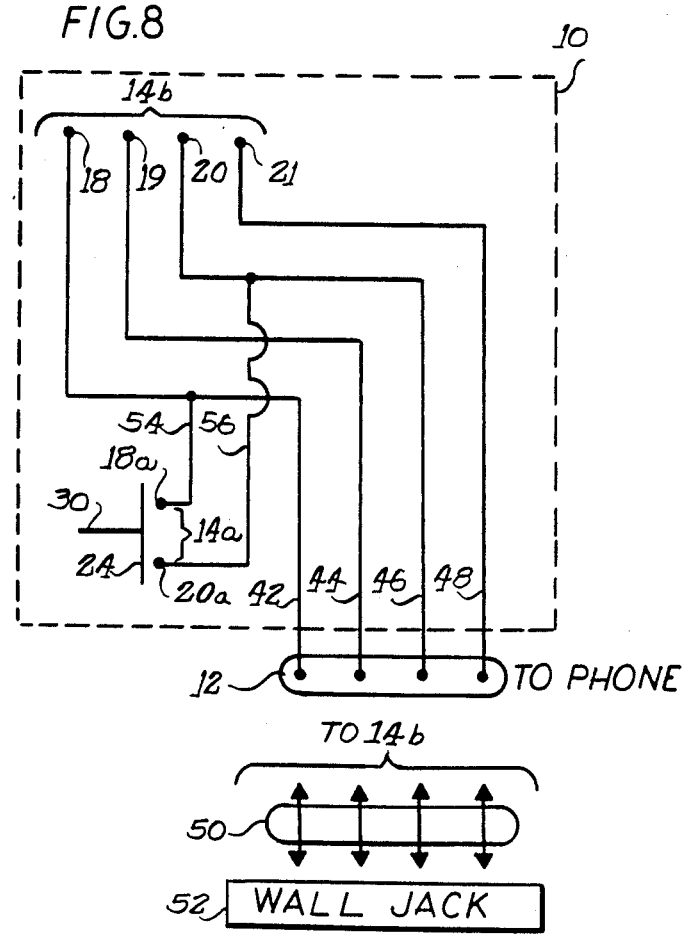

GROUND START KEY SWITCH

FIELD OF THE INVENTION

This invention relates generally to switch apparatus and more particularly, it relates to a ground start key switch mounted upon a modular duplex adapter for permitting shorting momentarily of a central office (C.O.) line to a ground potential when a private branch exchange (P.B.X.) is inoperative.

BACKGROUND OF THE INVENTION

In U.S. Pat. No. 4,594,490 issued on June 10, 1986, to Harold E. McCullough, there was disclosed a terminal pin shorting switch apparatus which includes an electrical shorting spring member 12 positioned within chamber 1001 of a housing component 100. The spring member 12 is comprised of a common member 120 formed at each end into generally C-configured sections 121, 122 extended into cantilever springs 123, 124. The tip contact ends 125, 126 of each cantilever spring are normally in engagement with a pair of terminal pins 3. An actuating member 11 comprised of a pivotal member 111 when rotated moves a cam surface 1101 against both cantilever springs so as to disengage the tip contact ends from the pair of terminal pins.

In U.S. Pat. No. 4,393,283 issued on July 12, 1983, to Toru Masuda, there is disclosed a jack case 3 for receiving a plug 6 which includes a detachable slide switch 12. The slide switch is operated by means of a movable contact strip 4 that engages the plug. When the plug 6 is not inserted into the jack case 3, the clip holder 19 of the slide switch 12 is urged by means of the free end portion 4d of the contact strip 4 to the right side position of FIG. 1, thereby bringing first and second terminals 17a and 17b into connection through means of clips 18 mounted upon the clip holder 19. On the other hand, upon insertion of a plug into the jack case, the clip holder 19 is caused to slide to the left side position so as to render engagement of second and third terminals 17b and 17c.

Neither of these two above-identified patents discloses a ground start switch like that of the present invention which permits momentarily shorting a central office line to a ground potential when a private branch exchange is inoperative. This is accomplished by means of a switch actuator mechanism which is adapted to be mounted onto a modular duplex adapter having a pair of jack terminals. A conductive member is attached to the switch actuator mechanism. The switch actuator mechanism includes a resilient lever arm which is depressible for causing engagement of the conductor member with the pair of jack terminals so as to electrically short them together.

OBJECTS OF THE INVENTION

Accordingly, it is a general object of the present invention to provide a ground start key switch which is relatively simple and economical to manufacture and assemble.

It is another object of the present invention to provide a ground start key switch for use with a modular duplex adapter so as to permit momentarily shorting a pair of jack terminals.

It is another object of the present invention to provide a ground start key switch which includes a switch actuator mechanism and a conductor member attached to the switch actuator mechanism so as to permit momentarily shorting a pair of jack terminals.

It is still another object of the present invention to provide a ground start key switch which includes a switch actuator mechanism having a resilient lever arm that is depressed for causing engagement of a conductor member with a pair of jack terminals, thereby electrically shorting them together.

SUMMARY OF THE INVENTION

In accordance with a preferred embodiment of the present invention, there is provided a ground start key switch which permits momentarily shorting of a line of a telephone company's central office to a ground potential when a private branch exchange is inoperative. A modular duplex adapter is provided which has a first jack terminal adapted for connection to the line of the telephone company's central office and has a second jack terminal adapted for connection to the ground potential. The ground start key switch includes a switch actuator mechanism adapted to be mounted onto the modular duplex adapter. A conductor member is attached to the switch actuator mechanism. The switch actuator mechanism includes a resilient lever arm which is depressible for causing engagement of the conductor member with the first and second jack terminals so as to electrically short the first and second jack terminals together in order to provide a closed loop path therebetween. The lever arm causes disengagement of the conductor member from the first and second jack terminals when it is released.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, and wherein:

FIG. 4 is a front plan elevational view of the switch actuator mechanism of the ground start key switch of the present invention;

FIG. 5 is a cross-sectional view, taken along the lines 5—5 of FIG. 4;

FIG. 6 is a plan view of the conductive member of the ground start key switch;

FIG. 7 is a side elevational view, taken along the lines 7—7 of FIG. 6; and

FIG. 8 is a schematic wiring diagram of the modular duplex adapter with the ground start key switch of the present invention.

DESCRIPTION OF THE PREFERRED EMBODIMENT

Figure 1:
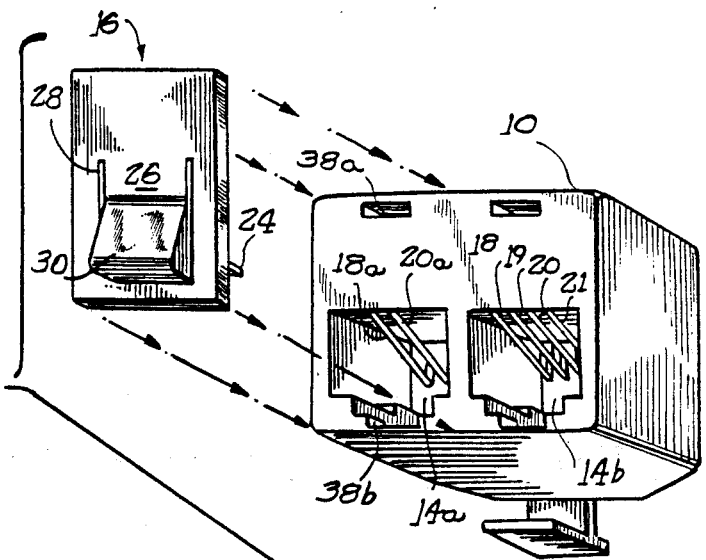
FIG. 1 is an exploded, perspective view of a modular duplex adapter which has mounted thereon a ground start key switch of the present invention.
Figure 2:
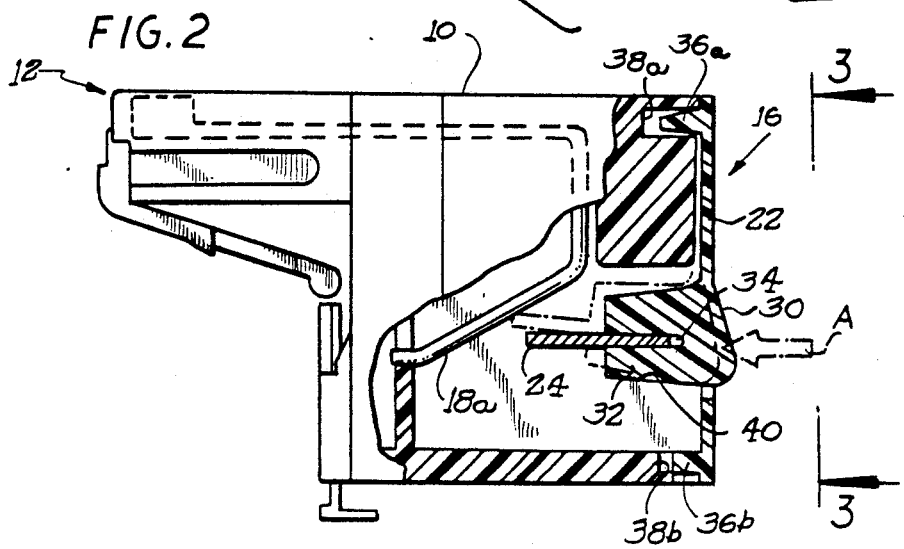
FIG. 2 is a side elevational view, partly in section, of the modular duplex adapter with the ground start key switch of the present invention mounted thereon.
Figure 3:
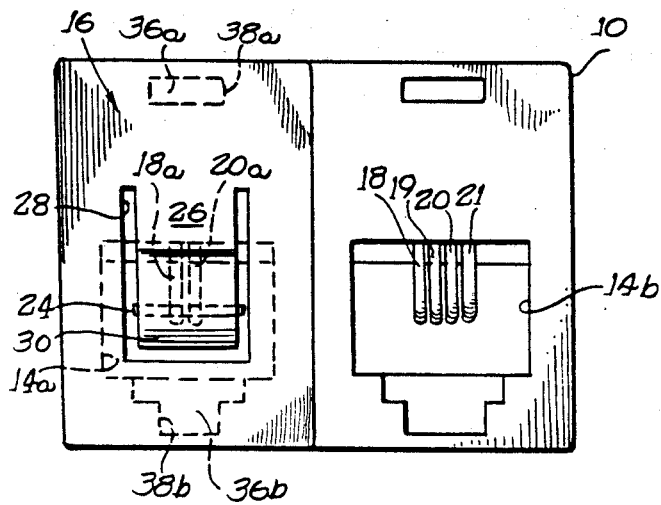
FIG. 3 is a front elevational view, taken along the lines 3—3 of FIG. 2.

Referring now in detail to the drawings, there is shown in FIGS. 1-3 a modular duplex adapter 10 which includes a plug portion 12 mounted upon its front end thereof and a pair of receptacles 14a, 14b defined within its back end. The left receptacle 14a, as viewed from FIG. 3, is mounted with a ground start key switch 16 of the present invention. The key switch 16 is designed to be secured or mounted to the back end of the modular duplex adapter 10 by any suitable means, such as, for example, sonic welding.

The modular duplex adapter 10 is of a conventional structure which has been modified slightly so that only two jack terminals 18a, 20a are provided within the left receptacle 14a rather than the normal four. It will be noted that there are still the standard four jack terminals 18, 19, 20, 21 provided within the right receptacle 14b. In practice, the plug portion 12 is inserted into an opening defined within the back of a telephone and the right receptacle 14b receives one end of a modular cord having plugs at both ends. The other plug end of the cord is inserted into a wall jack for connection to a central office (C.O.) of the telephone company. The key switch 16 is utilized for momentarily shorting the jack terminals 18a, 20 a together so as to provide a closed loop upon the telephone line connected to the C.O. when the customer's private branch exchange (P.B.X.) is inoperative, as will be explained more fully hereinafter.

The ground start key switch 16 shown generally in FIGS. 1–3 is comprised of a switch actuator mechanism 22 formed of an electrical insulating material and a generally rectangular-shaped conductive member 24. The conductive member 24 may be made of any suitable electrical conductive material, such as, for example, phosphor bronze. The details of the switch actuator mechanism 22 are illustrated in FIGS. 4 and 5 of the drawings. The details of the conductive member 24 are depicted in FIGS. 6 and 7.

Referring in particular to FIGS. 4 and 5, the switch actuator mechanism 22 has a generally rectangular configuration and includes an internal resilient lever arm 26 which is formed by means of a U-shaped slot 28. The lever arm 26 is located substantially within the central portion of the actuator mechanism 22 and has upon its first side an outwardly-extending projection 30 which extends out of the plane of the actuator mechanism 22. The outwardly-extending projection 30 is formed integrally with the lever arm 26 and functions to serve as an actuating member.

The lever arm 26 further includes upon its back side an inwardly-extending mounting member 32 having a horizontal slit 34 defined within its intermediate area. The mounting member 32 is formed integrally with the lever arm 26 and extends out of the plane of the actuator mechanism 22. The back side of the actuator mechanism 22 is provided with upper and lower tabs 36a, 36b which are adapted to be received within respective openings 38a, 38b (FIG. 2) of the duplex adapter 10 so as to facilitate their alignment and interengagement.

As can best be seen from FIGS. 6 and 7, the conductive member 24 is comprised of a flat plate or element having length and width dimensions of approximately 0.250 inches and a thickness of approximately 0.022 inches. The flat plate is inserted into the horizontal slit 34 of the mounting member 32 and is held in place due to frictional engagement therewith. In order to provide a more secure engagement, the mounting member 32 may be compressed forming a dimple 40 as to provide a tighter fit for the plate 24 as best seen in FIGS. 2 and 5.

A schematic wiring diagram of a modified modular duplex adapter 10 with the ground start key switch 16 of the present invention is illustrated in FIG. 8. The wires 42, 44, 46 and 48 are used to interconnect terminal pins (not shown) located within the plug portion 12 of the duplex adapter 10 with the respective jack terminals 18, 19, 20 and 21 disposed within the right receptacle 14b. Typically, the jack terminals 18 and 19 are connected by means of the modular cord 50 and the wall jack 52 to two telephone lines coming from the central office. In order that these two telephone lines can be momentarily shortened so as to produce a closed loop path when the private branch exchange is inoperative, two additional wires 54, 56 are provided so as to interconnect only the wires 42 and 46 with the jack terminals 18a and 20a disposed within the left terminal 14a.

The operation of the ground start key switch 16 which is intended for use in electrically momentarily shorting the jack terminals 18a and 20a of the modified modular duplex adapter 10 will now be explained with reference to FIGS. 2 and 8. The key switch 16 is mounted upon the back end of the duplex adapter 10 so that the conductive member 24 is normally not in engagement with the jack terminals 18a and 20a, as shown by means of the solid lines in FIG. 2. However, when it is desired to momentarily establish an electrical shorting path between the jack terminals 18a and 20a, the outwardly-extending projection 30 of the resilient lever arm 26 is depressed in the direction of arrow A. This will cause the conductive member 24 to move to the left position shown by means of the dotted lines of FIG. 2 so as to be engaged with portions of the jack terminals 18a and 20a, thereby shorting the same together. Upon release of the projection 30, it will spring back to the right position due to its resiliency and thus disengage the conductive member 24 from the jack terminals.

From the foregoing detailed description, it can thus be seen that the present invention provides a ground start key switch mounted upon a modular duplex adapter for permitting momentarily shorting a central office line to a ground potential when a private branch exchange is inoperative. The ground start key switch includes a switch actuator mechanism adapted to be mounted onto the modular duplex adapter having a pair of jack terminals. A conductor member is attached to the switch actuator mechanism. The switch actuator mechanism includes a resilient lever arm which is depressible for causing engagement of the conductor member with the pair of jack terminals so as to electrically short them together.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A ground start key switch for use with a modular duplex adapter to permit shorting momentarily a pair of jack terminals comprising:

switch actuator means adapted to be mounted onto a modular duplex adapter having a pair of jack terminals;

conductor means attached to said switch actuator means; and said switch actuator means including a resilient lever arm being depressible for causing engagement of said conductor means with said pair of jack terminals so as to electrically short said pair of jack terminals together, said lever arm causing disengagement of said conductor means with said pair of jack terminals when released.

2. A ground start key switch as set forth in claim 1, wherein:
said switch actuator means includes a substantially planar support member, and a substantially three-sided U-shaped slot is defined within said planar support member so as to in turn define said resilient lever arm integrally mounted upon said planar support member.

3. A ground start key switch as claimed in claim 1, wherein said switch actuator means is comprised of a switch actuator mechanism having said lever arm formed substantially in a central portion thereof.

4. A ground start key switch as claimed in claim 3, wherein said lever arm includes an outwardly-extending projection serving as an actuating member which extends out of a plane of said switch actuator mechanism on one side thereof and an inwardly-extending mounting member which extends out of said plane of said switch actuating mechanism on another side thereof.

5. A ground start key switch as claimed in claim 4, wherein said conductor means comprises a conductive member formed of a flat plate.

6. A ground start key switch as claimed in claim 5, wherein said mounting member is formed with a horizontal slit in an intermediate area thereof for retaining said flat plate therein.

7. A ground start key switch as claimed in claim 5, wherein said flat plate is made of phosphor bronze.

8. A ground start key switch as set forth in claim 5, wherein:
said pair of jack terminals are disposed within parallel vertical planes; and
said conductive member flat plate is disposed within a horizontal plane so as to electrically bridge said pair of jack terminals when said resilient lever arm is depressed so as to cause engagement of said conductive member flat plate with said pair of jack terminals.

9. A ground start key switch as claimed in claim 3, wherein said switch actuating mechanism is provided with upper and lower tabs on a back side thereof which are adapted to be received in corresponding openings formed in the duplex adapter so as to facilitate their alignment and interengagement.

10. A ground start key switch as claimed in claim 3, wherein said switch actuator mechanism is made of an electrical insulating material.

11. A ground start key switch as claimed in claim 3, wherein said switch actuator mechanism is fixedly secured to said duplex adapter by sonic welding.

12. A ground start key switch for permitting shorting momentarily of a line of a telephone company's central office to a ground potential when a private branch exchange is inoperative, comprising in combination:
a modular duplex adapter having a first jack terminal adapted for connection to the line of the telephone company's central office and a second jack terminal adapted for connection to the ground potential;
switch actuator means adapted to be mounted onto said modular duplex adapter;
conductor means attached to said switch actuator means; and
said switch actuator means including a resilient lever arm being depressible for causing engagement of said conductor means with said first and second jack terminals so as to electrically short said first and second jack terminals together in order to provide a closed loop path, said lever arm causing disengagement of said conductor means with said first and second jack terminals when released.

13. A ground start key switch as set forth in claim 12, wherein said switch actuator means further comprises:
a substantially planar support member; and
a substantially three-sided U-shaped slot defined within said planar support member for, in turn, defining said resilient lever arm integrally mounted upon said planar support member.

14. A ground start key switch as claimed in claim 12, wherein said switch actuator means is comprised of a switch actuator mechanism having said lever arm formed substantially in a central portion thereof.

15. A ground start key switch as claimed in claim 14, wherein said lever arm includes an outwardly-extending projection serving as an actuating member which extends out of a plane of said switch actuator mechanism on one side thereof and an inwardly-extending mounting member which extends out of said plane of said switch actuating mechanism on another side thereof.

16. A ground start key switch as claimed in claim 15, wherein said conductor means comprises a conductive member formed of a flat plate.

17. A ground start key switch as claimed in claim 16, wherein said flat plate is made of phosphor bronze.

18. A ground start key switch as claimed in claim 16, wherein said mounting member is formed with a horizontal slit in an intermediate area thereof for retaining said flat plate therein.

19. A ground start key switch as set forth in claim 16, wherein:
said first and second jack terminals are disposed within parallel vertical planes; and
said conductive member flat plate is disposed within a horizontal plane so as to electrically bridge said first and second jack terminals when said resilient lever arm is depressed so as to cause engagement of said conductive member flat plate with said first and second jack terminals.

20. A ground start key switch as claimed in claim 14, wherein said switch actuator mechanism is fixedly secured to said duplex adapter by sonic welding.

21. A ground start key switch as claimed in claim 14, wherein said switch actuating mechanism is provided with upper and lower tabs on a back side thereof which are adapted to be received in corresponding openings formed in the duplex adapter so as to facilitate their alignment and interengagement.

22. A ground start key switch as claimed in claim 21, wherein said switch actuator mechanism is made of an electrical insulating material.

* * * * *